United States Patent [19]

Huntzinger et al.

[11] Patent Number: 4,481,585
[45] Date of Patent: Nov. 6, 1984

[54] SYSTEM FOR SELECTIVELY CONTROLLING MOTOR VEHICLE ELECTRICAL LOADS

[75] Inventors: Gerald O. Huntzinger; Raymond O. Butler, Jr.; Lewis R. Hetzler; John Delaplane; Anthony L. Marks, all of Anderson, Ind.

[73] Assignee: General Motors Corporation, Detroit, Mich.

[21] Appl. No.: 289,464

[22] Filed: Aug. 3, 1981

[51] Int. Cl.³ .............................................. B60Q 1/00
[52] U.S. Cl. .................................. 364/424; 340/52 F; 340/66; 200/1 R; 364/900
[58] Field of Search ................... 200/1 R, 5 B, 6 B, 4; 364/424, 900; 318/652; 335/181; 340/52 F, 66

[56] References Cited

U.S. PATENT DOCUMENTS

| 1,680,416 | 8/1928 | Hodgkins | 335/181 |
|---|---|---|---|
| 2,993,963 | 7/1961 | Beardow | 200/30 R |
| 3,233,066 | 2/1966 | Stoddard et al. | 335/114 |
| 3,403,386 | 9/1968 | Perkins et al. | 364/900 |
| 3,546,401 | 12/1970 | Carlisle et al. | 200/1 R |
| 3,689,820 | 9/1972 | Takegawa | 318/594 |
| 3,743,799 | 3/1973 | Cork et al. | 200/6 B |
| 3,931,483 | 1/1976 | Thompson | 200/1 R |
| 3,944,902 | 3/1976 | Lacorre et al. | 318/593 |
| 3,974,346 | 8/1976 | Keprda | 200/5 B |
| 3,995,206 | 11/1976 | Aronstein et al. | 318/593 |
| 4,013,875 | 3/1977 | McGlynn | 364/424 |
| 4,021,714 | 5/1977 | Jones et al. | 318/594 |
| 4,264,791 | 4/1981 | Williams | 200/4 |
| 4,281,304 | 7/1981 | Koshman | 335/72 |
| 4,306,218 | 12/1981 | Leconte et al. | 364/424 |
| 4,320,266 | 3/1982 | Leiter et al. | 200/4 |

FOREIGN PATENT DOCUMENTS

| 1072895 | 6/1960 | Fed. Rep. of Germany . |
| 681221 | 9/1939 | Fed. Rep. of Germany . |
| 205062 | 5/1924 | United Kingdom . |
| 1196115 | 6/1970 | United Kingdom . |

OTHER PUBLICATIONS

UK Patent Application GB 2047964 Application Published Dec. 1980.

Primary Examiner—Felix D. Gruber
Assistant Examiner—Karl Huang
Attorney, Agent, or Firm—C. R. Meland

[57] ABSTRACT

A plurality of electrical load switches of the type operable to at least two operating conditions by the actuation of an operating member are connected in respective motor vehicle load circuits and are mounted in a switching unit having an actuating mechanism for actuating the switch operating members that is selectively locatable in each of a plurality of switch operating positions in each of which it is in register with an operating member. The switching unit is controlled by a microprocessor that effects the locating of the actuating mechanism in the switch operating position in which it may actuate the operating member of a load switch selected to be operated and the operating of the actuating mechanism when so located in response to function select electrical signals that indicate the load switches selected for operation.

6 Claims, 11 Drawing Figures

| NUMBER OF STEPS | DELAY COUNT |
|---|---|
| 1 | — |
| 2 | 200 |
| 3 | 100 – 190 |
| 4 | 100 – 110 – 120 |
| 5 | 100 – 090 – 080 – 120 |
| 6 | 100 – 080 – 073 – 065 – 105 |
| 7 | 100 – 080 – 065 – 055 – 070 – 110 |
| 8 | 100 – 080 – 065 – 055 – 050 – 065 – 110 |
| 9 | 100 – 080 – 065 – 055 – 050 – 050 – 060 – 130 |
Fig. 5
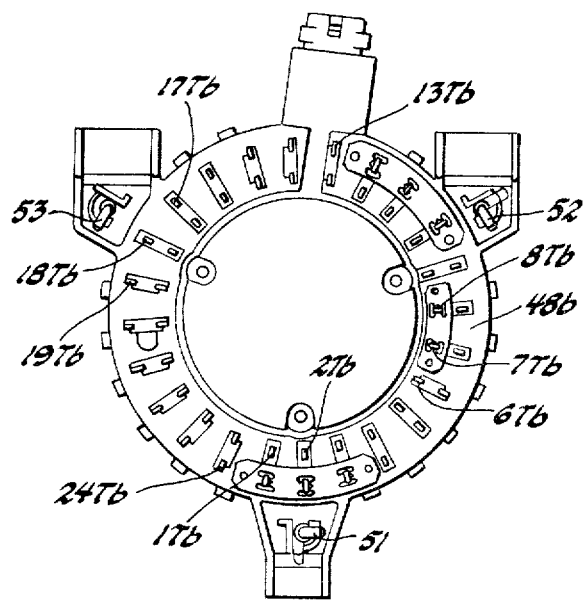
Fig. 6
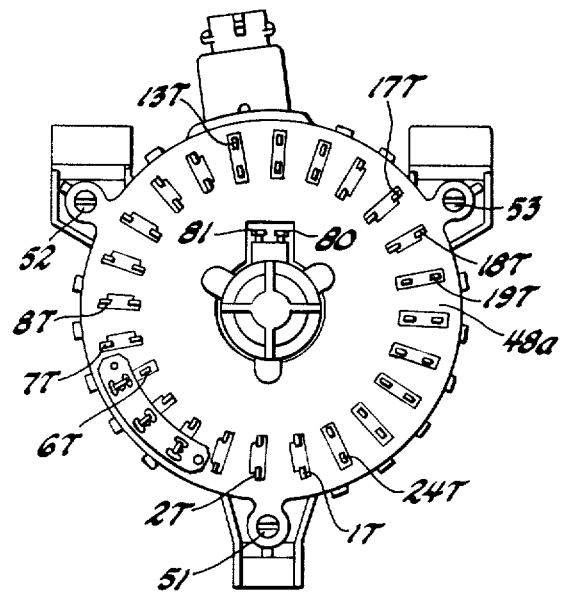
Fig. 7

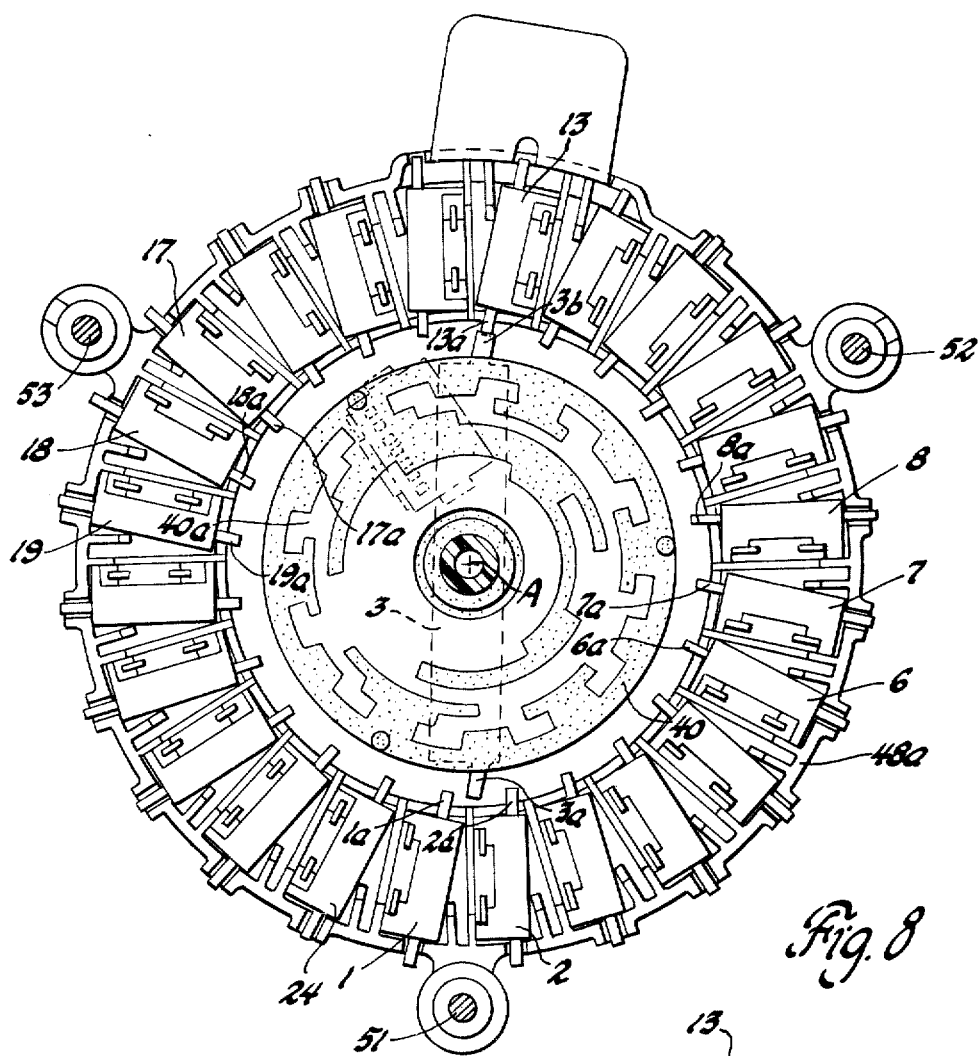

SYSTEM FOR SELECTIVELY CONTROLLING MOTOR VEHICLE ELECTRICAL LOADS

This invention is directed to a system for controlling the several electrical loads of a motor vehicle and, more specifically, to such a system wherein a switching unit including a plurality of electrical load switches connected in respective vehicle load circuits and a selectively locatable actuating mechanism for selectively effecting the operation of the load switches is controlled by a microprocessor that effects the location and operation of the actuating mechanism to effect the operation of each load switch selected to be operated in response to respective function select electrical signals that indicate the load switches selected for operation.

The system of this invention is a new concept for controlling the several electrical loads of a modern motor vehicle through the use of a microprocessor controlled switching unit combination. The switching unit includes a plurality of electrical load switches connected in respective vehicle load circuits that are operated by an actuating mechanism that is controlled by the microprocessor. The microprocessor provides control logic, memory and intelligence for the power control process by being programmed to coordinate numerous input signals to produce the desired control results. Among these input signals may be operator initiated function select signals that indicate the desired switching function to be effected and various automatically initiated function select signals that may be produced in response to abnormal engine operating parameters such as low battery condition, a generator malfunction, low oil pressure, high coolant temperature and so forth. This combination of the switching unit for load switching and the microprocessor for information processing and control of the switching unit operation provides a powerful new system to implement new control techniques in the automotive electrical system. For example, by monitoring battery state of charge, a system fault which is discharging the battery may be sensed and corrected automatically thereby preventing a "no start" condition from developing. If the generator system should fail, the time for an operating problem to develop may be extended by programming the system to shut down non-essential loads and give the operator warning. Similarly, loads accidentally left on may be sensed by the system and automatically turned off by the system to prevent a "no start" condition from developing.

The nature of this system automatically eliminates numerous special electronic units and relays commonly found on automotive vehicles for special control functions.

The microprocessor and switching unit may be contained in a single package or may be physically separated and interconnected by a suitable cable. It may be desirable to physically separate the two units because of packaging conveniences and intervehicle environmental conditions or to locate the microprocessor near the input circuits and the switching unit near the power source and controlled load circuits. This system provides many advantages such as the location of the switching unit near the power source and loads, reduced wire size, reduced heat losses because of shorter power leads, fewer connections and, very importantly, the minimizing of intrusion of power circuits into the vehicle passenger compartment. The microprocessor may be preprogrammed to provide standard manual control switching functions, logic functions which provide safety, convenience and improved vehicular reliability and sensor inputs which monitor vehicle conditions and provide automatic action. To provide the necessary function select input signals, simple, low current switches and light, low current control circuit wiring may be employed. Further, the function select switches may be located in multiple switch panels, convenient switch locations, remote switch locations such as door jamb switches and the function selected signals may be multiplexed as inputs to the microprocessor.

It is an object of this invention to provide an improved system for controlling the various electrical loads of a motor vehicle.

It is another object of this invention to provide an improved system for controlling the various electrical loads of a motor vehicle employing a microprocessor controlled switching unit combination.

It is another object of this invention to provide an improved system for controlling the various electrical loads of a motor vehicle employing a switching unit including a plurality of electrical load switches of the type operable to at least two operating conditions by the actuation of an operating member that are connected in respective vehicle load circuits and a selectively locatable actuator mechanism that is operable to actuate the operating members that is controlled by a unit responsive to input function select electrical signals that indicate respective load switches are selected for operation for locating the actuator mechanism in such a location that it may actuate the operating member of the selected load switch and for effecting the operation of the actuator mechanism when so located.

In accordance with this invention, a system for controlling the various electrical loads of a motor vehicle is provided wherein a switching unit including a plurality of electrical load switches of a type operable to at least two operating conditions connected in respective vehicle load circuits and a selectively locatable actuator mechanism is controlled by a unit responsive to input function select electrical signals for locating the actuator mechanism in such a location that it may operate a selected load switch and for effecting the operation of the actuator mechanism when so located.

For a better understanding of the present invention, together with additional objects, advantages and features thereof, reference is made to the following description and accompanying drawing in which:

FIG. 5 is a table useful for an understanding of the flow diagram of FIGS. 3 and 4;

FIG. 6 is a bottom view of that portion of FIG. 2 taken along line 6—6 and looking in the direction of the arrows;

FIG. 7 is a top view of that portion of FIG. 2 taken along line 7—7 and looking in the direction of the arrows;

FIG. 8 is a section view of that portion of FIG. 2 taken along line 8—8 and looking in the direction of the arrows;

FIG. 9 is a section view of that portion of FIG. 2 taken along line 9—9 and looking in the direction of the arrows;

Figure 1:
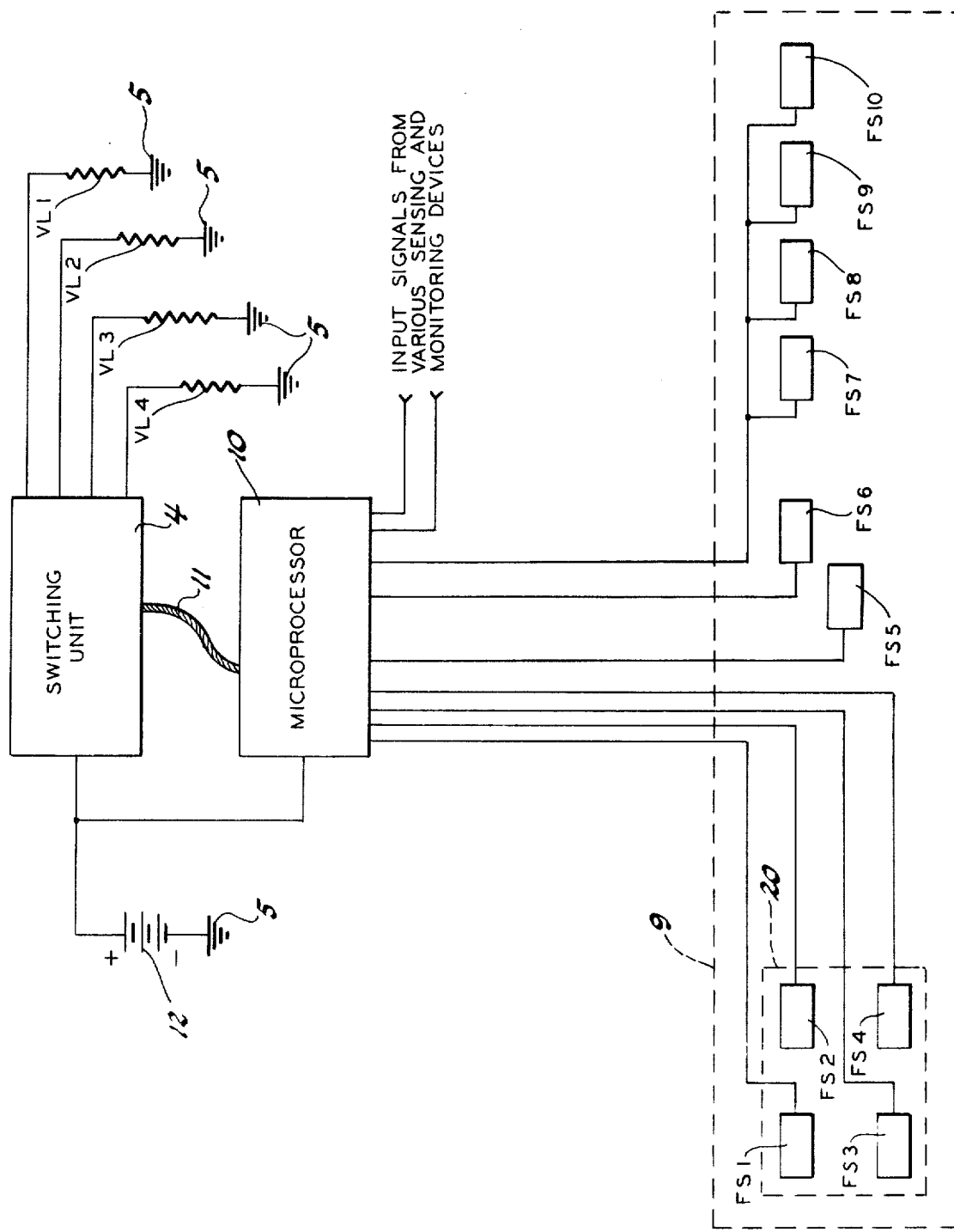
FIG. 1 is a block diagram of the system of the invention.
Figure 2:
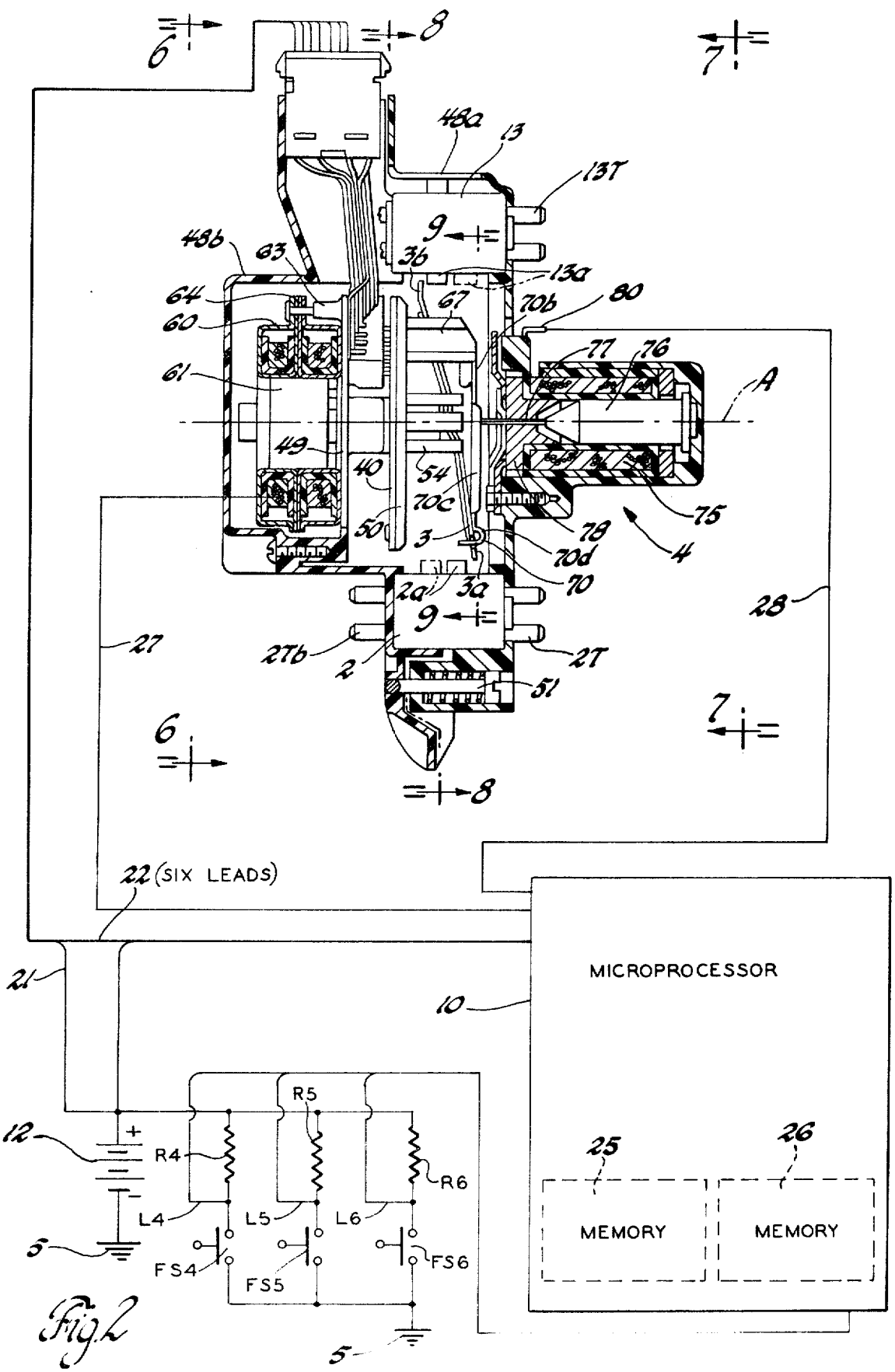
FIG. 2 is another diagram of the system of this invention partially in schematic and partially in block form.

As point of reference or ground potential is the same point electrically throughout the system, it is illustrated in FIGS. 1 and 2 by the accepted schematic symbol and referenced by the numeral 5.

In accordance with logic terminology well known in the art, throughout this specification logic signals will be referred to as "High" or logic 1 and "Low" or logic 0 signals. For purposes of this specification and without intention or inference of a limitation thereto, the "High" or logic 1 signals will be considered to be of a positive polarity potential and the "Low" or logic 0 signals will be considered to be of zero or ground potential.

The system of this invention for controlling the several electrical loads of a motor vehicle is set forth in block form in FIG. 1.

Switching unit 4 includes a plurality of electrical load switches of the type operable to at least two operating conditions by the actuation of an operating member that are connected in respective vehicle electrical load circuits and a selectively locatable actuator mechanism that is operable to actuate the operating members and is selectively locatable in each of a plurality of switch operating positions in each of which it is in register with an operating member. In a manner well known in the automotive art, each of the load switches included in switching unit 4 is operable to connect and to disconnect battery 12 from one or more of the vehicle electrical loads, four of which are illustrated as resistors in FIG. 1 and are referenced by the characters VL1, VL2, VL3 and VL4. That is, upon the operation of any one of these load switches to the operating condition in which an electrical circuit is completed thereby, at least one of the vehicle electrical loads is connected thereby across battery 12 and point of reference or ground potential 5. One example, and without intention or inference of a limitation thereto, of a switching unit suitable for use with the system of this invention is disclosed and described in detail in copending U.S. patent application Ser. No. 289,787, filed on Aug. 3, 1981 and now U.S. Pat. No. 4,403,121 that is assigned to the same assignee as is this invention. Additionally, certain portions of the switching unit disclosed and described in this copending U.S. patent application are disclosed and described in greater detail in another copending U.S. patent application Ser. No. 289,788, filed on Aug. 3, 1981 and now U.S. Pat. No. 4,399,335 that is assigned to the same assignee as is this invention. The specification and drawing of both of these copending U.S. patent applications are specifically incorporated by reference in this specification.

The function select circuitry 9 may be a plurality of electrical devices capable, upon operation, of producing respective function select electrical signals, each of which indicates the selection of at least one of the load switches of switching unit 4 for operation. The individual function select signal producing devices may be any device that produces a logic signal of a selected potential level while not in the operated condition that changes to another selected logic signal of a different potential level when in the operated condition. In FIG. 1, the function select devices are conveniently illustrated in block form and are referenced by the characters FS1, FS2, FS3, FS4, FS5, FS6, FS7, FS8, FS9 and FS10. Examples of these function select signal producing devices, and without intention that these cited examples be exhaustive, are conventional manually operated momentary contact push button switches, conventional manually operated maintained contact switches, vehicle door jamb door actuated switches, conventional automotive type ignition switches or any other type electrical switching device capable of providing a selected output logic signal while not in the operated condition and another selected output logic signal while in the operated condition. These function select signal producing devices may be mounted in the vehicle passenger compartment at locations convenient for selective operator operation, they may be mounted in locations for operation by certain vehicle components such as the doors or trunk lid, or they may be mounted in locations for operation in response to selected abnormal engine operating parameter values such as engine oil pressure or coolant temperature values not within selected ranges. These devices may be cluster mounted in multiple circuit control panels such as illustrated at 20 in FIG. 1, they may be separately located as are switches FS5 and FS6 of FIG. 1 or a plurality thereof such as switches FS7, FS8, FS9 and FS10 of FIG. 1 may be multiplexed. The only requirement is that each be arranged to produce, when operated, a change in logic signal potential level upon the output thereof which may be an electrical lead. For purposes of this specification, these function select signal producing devices will hereinafter be referred to as function select switches.

Microprocessor 10 may be any suitable microprocessor unit such as that commercially marketed by Motorola Semiconductor Products Company, Inc., of Phoenix, Ariz., under the designation MC6802. In a manner to be explained later in this specification, microprocessor 10 is programmed to be responsive to the function select signals produced by the function select switches of function select circuitry 9 for determining the switch operating position in which the actuator mechanism must be located to actuate the operating member of the selected load switch to effect the operation thereof to the other operating condition, for determining the actual switch operating position in which the actuator mechanism is located, for locating the actuator mechanism in the determined switch operating position if different than the actual switch operating position, and for effecting the operation of the actuator mechanism when so located. The switching unit 4 and microprocessor 10 may be contained within a unit package or may be physically separated and interconnected by a suitable cable 11. For example, switching unit 4 may be mounted in the vehicle engine compartment near the supply potential source and the electrical loads and the microprocessor 10 may be mounted remote therefrom in a more favorable environment and the two units interconnected by a suitable cable.

An important feature of the system of this invention is that it is adaptable to be responsive to function select signals that may be automatically produced by various sensing and monitoring devices in response to abnormal engine operating conditions such as high coolant temperature or low oil pressure. The microprocessor 10 may be programmed to respond to a high coolant temperature indicating function select signal to automatically control switching unit 4 to effect the energization of an electric motor driven cooling fan. Similarly, microprocessor 10 may be programmed to respond to a low oil pressure indicating function select signal to automatically control switching unit 4 to effect the deenergization of the engine ignition system and the energization of a low oil pressure warning display. Further, the microprocessor 10 may be programmed to respond to energized headlight circuitry after the ignition switch has been turned off to automatically control switching unit 4 to effect the deenergization of the headlight circuitry upon the conclusion of a predetermined delay to prevent battery discharge.

FIG. 2 of the drawing sets forth an elevation view partially in section of a switching unit suitable for use with the system of this invention. Single line interconnections between microprocessor 10 and switching unit 4 are also set forth and will be explained in detail later in this specification. In addition, three function select signal producing switches are conveniently illustrated as manually operable momentary contact push button type switches FS4, FS5 and FS6 connected in parallel across battery 12 and point of reference or ground potential 5 through respective series resistors R4, R5 and R6. As has been previously brought out in this specification, these function select signal producing switches may be any other type electrical switch that is capable of producing a selected output function select electrical signal upon the operation thereof. While function select switches FS4, FS5 and FS6 are not in the operated condition as illustrated in FIG. 2, a logic 1 signal of a positive polarity potential with respect to point of reference or ground potential 5 is present upon each of respective leads L4, L5 and L6. Upon the operation of any one of these switches such as FS4 to the other operating condition to complete a circuit through the corresponding resistor such as R4 and point of reference or ground potential 5, a logic 0 signal of substantially ground potential is present upon the corresponding lead such as L4. Therefore, these individual function select switches produce a logic signal of a selected potential level while not in the operated condition that changes to another selected logic signal of a different potential level when in the operated condition. Although for purposes of this specification the logic signal changes from a logic 1 to a logic 0, it is to be specifically understood that the reverse may be true without departing from the spirit of the invention. The function select signal produced by any one of the function select switches such as FS4, FS5 or FS6 is applied through respective leads such as L4, L5 and L6 to a desired load switch operating condition memory circuit 26 contained within microprocessor 10. The way this function select signal information is employed by microprocessor 10 to effect the operation of the selected load switch included in switching unit 4 will be explained in detail later in this specification.

As is best seen in FIG. 2 wherein a switching unit 4 suitable for use with the system of this invention is set forth in partial section elevation, a two-part housing 48a and 48b of a suitable plastic material that may be secured together by any suitable fastening arrangement such as spring latches 51, 52 and 53, as best seen in FIGS. 6 and 7, is designed to securely support a plurality of individual electrical load switches. Each of the individual electrical load switches may be of the conventional sliding contact type having an operating tab that is movable in two opposite directions to establish, respectively, one circuit condition or another circuit condition of the switch. Although there are twenty-four individual electrical load switches employed in this embodiment, since all of these switches are substantially physically identical, ten are referenced by the reference numerals 1, 2, 6, 7, 8, 13, 17, 18, 19 and 24 as is best seen in FIGS. 8 and 9. These twenty-four individual electrical load switches are so mounted and oriented that the operating tab of each extends toward a central axis A to define a circle substantially normal to and concentric with the central axis A and is movable in two directions substantially in the direction of central axis A to establish, respectively, one circuit condition or another circuit condition of the corresponding switch.

Figure 10:
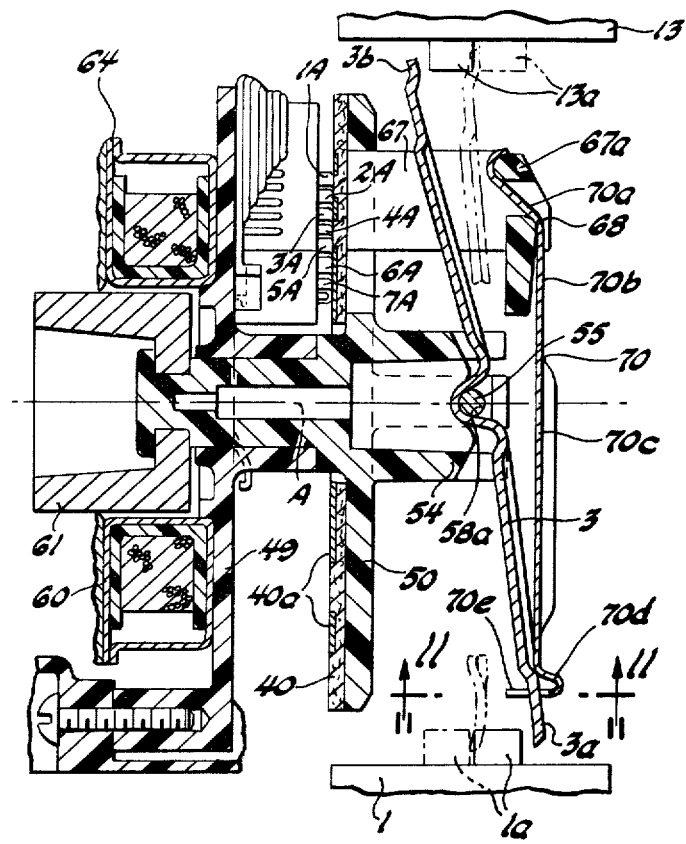
FIG. 10 is an elevation view in section of the switch actuating mechanism of the switching unit of FIG. 2.

As is best seen in FIGS. 2 and 10, a rotor 50 is supported for rotation substantially about central axis A in a plane substantially normal to central axis A by a support member 49 and is arranged to carry a switch actuator arm 3 that extends across the diameter of the circle defined by the individual electrical switch operating tabs and is of such a dimension as to be in radially overlapping relationship to the individual electricaor 50 is arranged to provide a journal bearing for actuator arm 3 that is maintained in position by a retaining pin 55. For the reason that will be brought out later in this specification, the overlapping ends of actuator arm 3 are arranged to be in register with each of the individual electrical switch operating tabs at mutually exclusive switch operating positions by circumferentially offsetting the ends in such a manner that actuator arm 3 is in register with each individual electrical switch operating tab at two switch operating positions, one for each end. Therefore, actuator arm 3 is indicated to have a switch operating projection 3a and 3b on respective opposite ends that are circumferentially offset from each other.

To position rotor 50 with one end or the other end of actuator arm 3 on opposite sides of the axis of tilt in register with a selected individual electrical switch operating tab, rotor 50 is connected to the rotor 61 of a step motor 60 that is selectively operable to position rotor 50 in selected ones of a plurality of switch operating positions in each of which one of the ends of actuator arm 3 is in register with a selected one of the individual electrical switch operating tabs. In this embodiment, the unit selected for step motor 60 is the functional equivalent of a commercially available device marketed by North American Phillips Controls Corporation of Cheshire, Conn., under the designation model number K-82701-T1. Motor 60 may be secured to support member 49 by any suitable fastening arrangement such as a group of tabs, one of which is referenced by the numeral 63, FIG. 2, extending from support member 49 through accommodating openings in motor flange 64.

Figure 11:
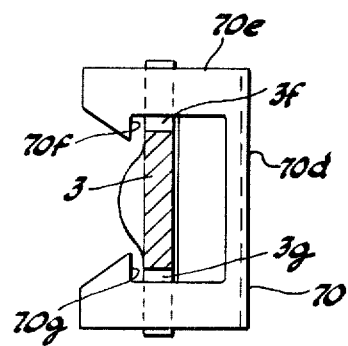
FIG. 11 is a section view of FIG. 10 taken along line 11—11 and looking in the direction of the arrows.

To normally tilt actuator arm 3 in a first direction, a spring 70 is provided. Spring 70, FIG. 10, is an elongated unitary spring of a flat spring material characterized by a reverse double arc portion 70a at one extremity thereof, a contiguous flat cantilevered section 70b, a contiguous intermediate section 70c and a contiguous second reverse double arc section 70d at the opposite extremity thereof. The second reverse double arc section 70d is formed to provide a terminating portion 70e having two spaced shoulders 70f and 70g lying in the same plane and extending toward the center line thereof, as is best seen in FIG. 11, that engage accommodating notches 3f and 3g of actuator arm 3.

To accommodate spring 70, rotor 50 carries another support arrangement such as stanchion 67 that extends substantially in the direction of central axis A, is radially displaced from stanchion 54 and is arranged to provide a fulcrum 68 for the first reverse double arc portion 70a of spring 70. Upon the assembly of spring 70, one of the arcs of the reverse double arc portion 70a is retained by a member 67a formed as a portion of stanchion 67; the other of the arcs of reverse double arc portion 70a is accommodated by fulcrum 68 and the shoulders 70f and 70g of terminating portion 70e engaged the respective notches 3f and 3g of actuator arm 3. With this arrangement, the normal force of spring 70 is in a counterclockwise direction about fulcrum 68, consequently, as viewing FIG. 10, actuator arm 3 is spring force tilted in a counterclockwise direction about the axis of tilt by spring 70 to a position in which the ends thereof on opposite sides of the axis of pivot are on the operating side of the several individual electrical switch operating tabs.

To tilt actuator arm 3 in a second opposite direction against the force of spring 70 when one of the ends thereof is in register with an individual electrical switch operating tab to engage the operating tab with which the one end of actuator arm 3 is in register to operate the corresponding electrical switch, a solenoid coil 75, FIG. 2, having an armature 76 of a magnetic material is employed. Armature 76 may be of a circular cross section having a tapered portion reducing down to an actuating rod 77 that passes through a guide 78 and is in operating engagement with portion 70c of spring 70. Electrical power may be supplied to solenoid coil 75 through input terminals 80 and 81, FIG. 7. Solenoid coil 75 is so wound that, upon the energization thereof, armature 76 is activated in a direction toward spring 70 to tilt actuator arm 3 in a second opposite clockwise direction about the axis of pivot. Referring to FIG. 2, should end 3b of actuator arm 3 be in register with operating tab 13a of electrical switch 13 upon the tilt of actuator arm 3 in a clockwise direction under the influence of energized solenoid coil 75, end 3b thereof operatively engages operating tab 13a and moves this tab substantially in the direction of central axis A away from rotor 50 from the position shown by solid lines to the position shown by dashed lines to operate electrical switch 13 out of one operating condition and to establish another operating condition. Should end 3a of actuator arm 3 be in register with operating tab 2a of electrical switch 2 upon the tilt of actuator arm 3 in a clockwise direction under the influence of energized solenoid coil 75, end 3a thereof operatively engages operating tab 2a and moves this tab substantially in the direction of central axis A toward rotor 50 from the position shown by solid lines to the position shown by dashed lines to operate switch 2 out of one operating condition and to establish another operating condition.

To provide for external electrical connections, each of the individual electrical switches may have two spade-type terminals extending from each opposite end thereof that are arranged to extend through accommodating openings in top portion 48a and through accommodating openings in the bottom portion 48b of the housing as is best seen in FIGS. 6 and 7. In FIG. 7 of the drawing, ten of these terminal pairs corresponding to individual electrical switches 1, 2, 6, 7, 8, 13, 17, 18, 19 and 24 that extend through accommodating slots in housing portion 48a are identified by the respective reference numerals 1T, 2T, 6T, 7T, 8T, 13T, 17T, 18T, 19T and 24T. In FIG. 6 of the drawing, ten of these terminal pairs corresponding to individual electrical switches 1, 2, 6, 7, 8, 13, 17, 18, 19 and 24 that extend through accommodating slots in housing portion 48b are identified by respective reference numerals 1Tb, 2Tb, 6Tb, 7Tb, 8Tb, 13Tb, 17Tb, 18Tb, 19Tb and 24Tb.

As there are twenty-four circumferentially arranged individual electrical load switches in this embodiment and since the ends of actuator arm 3 are arranged to be brought into register with each of the individual electrical switch operating tabs at mutually exclusive switch operating positions, it is necessary that step motor 60 be arranged to position rotor 50 in each of a plurality of switch operating positions of a number equal to twice the number of individual electrical load switches, forty-eight in this embodiment, with each individual electrical switch operating tab and each space between adjacent operating tabs being a switch operating position. With reference to FIG. 9, it will be assumed for purposes of this specification that end 3a of actuator arm 3 is the reference end; that operating tab 1a of individual electrical switch 1 is switch operating position number one and that the switch operating positions are numbered sequentially from position number one in a clockwise direction. As individual electrical switch operating tab 1a of individual electrical switch 1 is in switch operating position number one and end 3a of actuator arm 3 is the reference end thereof, rotor 50 is shown in FIG. 9 to be positioned in switch operating position number two in which end 3a of actuator arm 3 is located in the space between adjacent individual electrical switch operating tabs 1a and 2a of respective individual electrical switches 1 and 2 and end 3b of actuator arm 3 is located in register with individual electrical switch operating tab 13a of individual electrical switch 13. Upon the energization of solenoid coil 75 with rotor 50 positioned in this switch operating position number two, actuator arm 3 is tilted in a clockwise direction about the axis of pivot and end 3b thereof engages and operates individual electrical switch operating tab 13a of individual electrical switch 13 substantially in the direction of central axis A away from rotor 50 to establish the selected circuit condition of individual electrical switch 13 to which it is operated by end 3b of actuator arm 3. As end 3a of actuator arm 3 is located in the space between adjacent individual electrical switch operating tabs 1a and 2a of respective individual electrical switches 1 and 2, end 3a does not engage an individual electrical switch operating tab in this switch position.

With the several switch operating positions numbered as hereinabove set forth, each of the several individual electrical switch operating tabs is in an odd numbered switch operating position and each of the several spaces between each adjacent pair of individual electrical switch operating tabs is in an even numbered switch operating position. To operate any one of the several individual electrical switch operating tabs in a direction toward rotor 50 by end 3a of actuator arm 3, rotor 50 is positioned by motor 60 to the odd numbered switch operating position of the operating tab desired to be operated. To operate any one of the several individual electrical switch operating tabs in a direction away from rotor 50 by end 3b of actuator arm 3, rotor 50 is positioned by motor 60 to the even numbered switch operating position in which end 3b of actuator arm 3 is in register with the operating tab desired to be operated. To illustrate the operation of the switching unit of this invention, the positioning of rotor 50 to effect the operation of one of the individual electrical switch operating tabs by each end 3a and end 3b of actuator arm 3 will now be described.

To next position rotor 50 in the switch operating position in which individual electrical switch 19 may be operated to establish the selected circuit condition thereof to which it is operated by end 3a of actuator arm 3, rotor 50 is rotated by step motor 60 from switch operating position number two in a clockwise direction through thirty-five switch operating positions or in a counterclockwise direction through thirteen switch operating positions to switch operating position number thirty-seven in which end 3a of actuator arm 3 is in register with individual electrical switch operating tab 19a of individual electrical switch 19 and end 3b is located in the space between adjacent individual electrical switch operating tabs 6a and 7a of respective individual electrical switches 6 and 7. Upon the energization of solenoid coil 75 with rotor 50 positioned in this switch operating position number thirty-seven, actuator arm 3 is tilted in a clockwise direction about the axis of pivot and end 3a thereof engages and operates individual electrical switch operating tab 19a of individual electrical switch 19 substantially in the direction of central axis A toward rotor 50 to establish the selected circuit condition of individual electrical switch 19 to which it is operated by end 3a of actuator arm 3. As end 3b of actuator arm 3 is located in the space between adjacent individual electrical switch operating tabs 6a and 7a of respective individual electrical switches 6 and 7, end 3b does not engage an individual electrical switch operating tab in this switch position.

To next position rotor 50 in the switch operating position in which individual electrical switch 19 may be operated to establish the selected circuit condition thereof to which it is operated by end 3b of actuator arm 3, rotor 50 is rotated by step motor 60 from switch operating position number thirty-seven in a clockwise direction through twenty-five switch operating positions or in a counterclockwise direction through twenty-three switch operating positions to switch operating position number fourteen in which end 3b of actuator arm 3 is in register with individual electrical switch operating tab 19a of individual electrical switch 19 and end 3a is located in the space between adjacent individual electrical switch operating tabs 7a and 8a of respective individual electrical switches 7 and 8. Upon the energization of solenoid coil 75 with rotor 50 positioned in this switch operating position number fourteen, actuator arm 3 is tilted in a clockwise direction about the axis of pivot and end 3b thereof engages and operates individual electrical switch operating tab 19a of individual electrical switch 19 substantially in the direction of central axis A away from rotor 50 to establish the selected circuit condition of individual electrical switch 19 to which it is operated by end 3b of actuator arm 3. As end 3a of actuator arm 3 is located in the space between adjacent individual electrical switch operating tabs 7a and 8a of respective individual electrical switches 7 and 8, end 3a does not engage an individual electrical switch operating tab in this switch position.

From this description, it may be noted that (1) end 3a of actuator arm 3 is in register with one individual electrical switch operating tab in each of the odd numbered switch operating positions; (2) end 3b of actuator arm 3 is in register with one of the individual electrical switch operating tabs in each of the even numbered switch operating positions; and (3) that, depending upon the switch operating position in which rotor 50 is positioned and the next selected switch operating position to which it is to be rotated, there may be a fewer number of switch operating positions to be traversed by clockwise rotor rotation in some instances or by counterclockwise rotor rotation in other instances. To save time, it is desirable that the fewer number of switch operating positions be traversed during each repositioning of rotor 50. Therefore, motor 60 is preferably arranged to be selectively operable to rotate rotor 50 in either direction through a succession of discrete switch operating positions.

In the system of this invention, step motor 60 is digitally controlled by microprocessor 10. In a manner well known in the electronic data processor art, this unit may be programmed to position rotor 50 in response to digital command signals that may be produced by momentary contact electrical switches arranged for manual operation to select each of several different electrical circuit control functions.

To provide for an accurate determination of the switch operating position in which rotor 50 is actually located, rotor 50 carries a code wheel 40 preferably on the side facing motor 60 as is best seen in FIGS. 2, 8 and 10. Code wheel 40 may be a disc of an insulating material that is arranged to support a conductive pattern 40a in a manner well known in the art such as printed circuit techniques. Conductive pattern 40a is arranged to have a plurality of concentric tracks, each of which is engaged by a respective sliding contact brush and a common track also engaged by a sliding contact brush through which operating potential is applied to conductive pattern 40a. These brushes are best illustrated in FIG. 10 wherein each is referenced by the respective reference numeral 1A, 2A, 3A, 4A, 5A, 6A and 7A. In FIG. 10, brush 7A is illustrated as being in sliding electrical contact with the common concentric track of conductive pattern 40a and each of the other brushes is in sliding contact with a respective other concentric track of conductive pattern 40a and each corresponds to a respective bit position of a digital signal representation. Brush 7A may be connected to a source of direct current electrical power, such as an automotive type battery 12, through a lead 21 as shown in FIG. 2 and each of brushes 1A, 2A, 3A, 4A, 5A and 6A is connected to point of reference or ground potential 5 through a respective resistor. As a consequence, when any one or more of these brushes is in electrical contact with a conductive portion of conductive pattern 40a, a digital signal appears across the corresponding resistor and point of reference or ground potential 5 and is applied through leads 22 as a digital input signal to the associated microprocessor 10 as is well known in the art. Conductive pattern 40a is so arranged that, as rotor 50 is rotated, only one bit of the digital signal representation changes at a time. As a consequence, the output signals from these brushes are not true binary numbers but, rather, are digital signal representations of respective switch operating positions. One example of a code of this type is the familiar gray code well known in the art. As a consequence, as rotor 50 is rotated, a series of digital signal representations of switch operating positions is applied as input signals through leads 22 to the associated microprocessor 10 and are employed thereby in a manner to be later explained in this specification. As there are forty-eight switch operating positions with the embodiments herein described, a six bit digital signal representation is required to have a unique digital signal representation for each switch position.

As has been previously brought out in this specification, the switching unit 4 performs the power switching functions of an automotive vehicle under the control of microprocessor 10. Also as has been previously brought out, a plurality of function select switches are provided. Each of these switches has an output lead that normally has a logic signal of a selected level thereon while the switch is not operated that changes potential level to another selected logic signal upon the operation thereof. Each of these function select switches is arranged to produce, when operated, a change in potential level in the logic signal present upon the output lead thereof. The logic signals appearing upon the function select switch output circuit leads are employed as input signals to the microprocessor 10 that is arranged to read or sense these output circuit leads through a multiplexer arrangement. The rate of scan of these output circuit leads is of the order of approximately five milliseconds.

In the switching unit disclosed in this specification, there are twenty-four individual electrical load switches and forty-eight switch operating positions of rotor 50. A memory device such as a register circuit having an address or bit position corresponding to each load switch is provided for storing in each address or bit position a logic signal indicative of the actual switch operating condition of the corresponding load switch and another memory device such as a register circuit having an address or bit position corresponding to each load switch is provided for storing in each address or bit position a logic signal indicative of the desired switch operating condition of the corresponding load switch. These memory devices are referenced in FIG. 2 by respective numerals 25 and 26.

In a manner well known in the microprocessor programming art, the microprocessor 10 is preprogrammed to:

1. continuously scan the function select switch output circuit leads at a rate of the order of approximately five milliseconds;
2. detect a change of potential level upon any of the function select switch output circuit leads from one level to another level indicating that a switching function has been selected;
3. to sense, upon the detection of a change of potential level, the logic signal contained in the address(es) of the actual switch operating condition memory device of the corresponding selected load switch(es) and to place the opposite logic signal indicative of the other switch operating condition in the address(es) of the desired switch operating condition memory device of the corresponding selected load switch(es);
4. to scan the desired and actual switch operating condition memory devices for a discrepancy between the actual and desired switch operating condition logic indicating signals at any corresponding address;
5. to double the number assigned to the load switch to which the address of the actual and desired switch operating condition memory devices at which a discrepancy is detected corresponds;
6. to sense the logic signal present in this address in the actual switch operating condition memory device and to add one to the number obtained in step 5 if the function is to be a selected switch operating condition and to leave this number the same if the function is to be the other switch operating condition;
7. to determine and store the desired switch operating position in which the rotor of the switching unit must be positioned to perform the desired switching function by sensing the binary number stored in the address of a first lookup table corresponding to the number obtained in step 6 in which the binary number of the switch operating position in which the rotor must be positioned to effect the desired switching function is stored;
8. to energize two step motor windings;
9. to sense the digital signal representation of rotor position as produced by the code wheel attached to the rotor;
10. to determine the switch operating position in which the rotor is positioned by sensing the binary number stored in the address of another second lookup table corresponding to the digital signal representation of switch operating position produced by the code wheel in which the binary number of the switch operating position corresponding to this digital signal representation is stored;
11. to determine the required number of steps and the direction of rotation required to reposition the rotor through the shortest number of steps in the switch operating position in which it must be positioned to effect the desired switching function by subtracting the switch operating position to which the rotor must be repositioned from the switch operating position in which the rotor is aligned and repositioning the rotor as follows:
    a. if the difference is a negative number of an absolute value of twenty-four or less, the motor is stepped in a clockwise direction by a number of steps equal to the absolute value of the difference;
    b. if the difference is a negative number with an absolute value greater than twenty-four, the absolute value of the difference is subtracted from forty-eight and the motor is stepped in a counterclockwise direction by a number of steps equal to this difference;
    c. if the difference is a positive number of a value of twenty-four or less, the motor is stepped in a counterclockwise direction by a number of steps equal to the difference; and
    d. if the difference is a positive number greater than twenty-four, the value of the difference is subtracted from forty-eight and the motor is stepped in a clockwise direction by a number of steps equal to this difference;
12. to determine after the repositioning operation whether or not the rotor is positioned in the desired switch operating position to perform the desired switching function by sensing the binary number stored in the address of the second lookup table corresponding to the digital signal representation of switch operating position produced by the code wheel in which the binary number of the switch operating position corresponding to this digital signal representation is stored and comparing the binary number stored in this address with the binary number of the desired switch operating position;
13. to repeat step 11 if the binary numbers are not the same or to energize the solenoid coil if the two compared numbers do agree and to place the logic signal indicative of the actual switch operating condition in the address of the actual switch operating condition memory device corresponding to the load switch required to perform the function.

For purposes of this specification, it will be assumed that each of the output leads of the function select switches normally has a "High" electrical signal thereon through a pull up resistor to a direct current potential source such as the automobile battery; that upon the operation of any one of the function select switches, a "Low" electrical signal is present upon the corresponding output lead; that the logic signal indicative of an "On" function is a logic 1; that the logic signal indicative of an "Off" function is a logic 0; that it is desired to turn the vehicle parking lights on; that load switch 17 of FIG. 9 is the load switch selected to control the parking light switching functions; that rotor 50 is in switch operating position 2 as indicated by FIG. 9; that the operation of operating tab 17a of load switch 17 must be operated toward rotor 50 for the "On" function; and that all of the load switches are in the "Off" operating condition with a logic 0 in each of the addresses or bit positions of the actual and desired switch operating condition memory devices.

Should it be desired to turn the parking lights "On", the corresponding function select switch located in the passenger compartment is operated to place a logic 0 upon the corresponding output lead thereof. When the microprocessor detects this change of potential level indicating that a switching function has been selected, the logic signal contained in the address of the actual switch operating condition memory device 25 corresponding to load switch 17 is detected. Since the logic signal contained in this address is a logic 0, a logic 1 signal is placed in the corresponding address of the desired switch operating condition memory device 26 corresponding to load switch 17. When this discrepancy between the logic signals present in the addresses of the actual and desired switch operating condition memory devices corresponding to load switch 17 is detected, the number 17 is doubled to thirty-four and, since an "On" function is desired, one is added to this number to make it thirty-five. The binary number of the switch operating position number thirty-three in which the rotor 50 must be positioned to effect the desired "On" switching function is sensed in address number thirty-five of the first lookup table. Step motor 60 is then energized through lead 27, FIG. 2, to align rotor 50 in the position as determined by the magnetic field produced by the energized windings and the digital signal representation of rotor position as produced by the code wheel attached to rotor 50 is sensed. The binary number of the switch operating position in which the rotor is positioned is sensed in the address corresponding to the digital signal representation produced by the code wheel in the second lookup table which, for purposes of this specification, will be assumed to be switch operating position number two as shown in FIG. 9. Since rotor 50 is positioned in switch operating position number two, the desired switch operating position thirty-three is subtracted from the actual switch operating position number two to produce a difference of minus thirty-one. As this is a negative number with an absolute value greater than twenty-four, the absolute value thereof, thirty-one, is subtracted from forty-eight to obtain a difference of seventeen. Consequently, rotor 50 is stepped in a counterclockwise direction through seventeen steps or switch operating positions to switch operating position number thirty-three in which end 3a of actuator arm 3 is in register with operating tab 17a of switch 17. The digital signal representation as produced by code wheel 40 is again sensed and the binary number contained in the address of the second lookup table corresponding to this digital signal representation is sensed. If there is agreement between this sensed binary number and the binary number of the desired switch operating position, solenoid 75 is energized through lead 28, FIG. 2, to tilt arm 3 in a clockwise direction about the pivot point to effect the operation of operating tab 17a of load switch 17 substantially in the direction of central axis A toward rotor 50 to effect the "On" switch function for load switch 17 to energize the parking lights. Upon the operation of solenoid 75, a logic 1 signal indicating the parking lights are "On" is placed in the address or bit position of the actual switch operating condition memory device 25 corresponding to load switch 17.

Should it be desired to turn the parking lights "Off", the corresponding function select switch located in the passenger compartment is operated to place a logic 0 upon the corresponding output lead thereof. When the microprocessor detects this change of potential level indicating that a switching function has been selected, the logic signal contained in the address of the actual switch operating condition memory device 25 corresponding to load switch 17 is detected. Since the logic signal contained in this address is a logic 1 as the parking lights are on, a logic 0 signal is placed in the corresponding address of the desired switch operating condition memory device 26 corresponding to load switch 17. When this discrepancy between the logic signals present in the addresses of the actual and desired switch operating condition memory devices corresponding to load switch 17 is detected, the number 17 is doubled to thirty-four and, since an "Off" function is desired, this number is left at thirty-four. The binary number of the switch operating position number ten in which the rotor 50 must be positioned to effect the desired "Off" switching function is sensed in address number thirty-four on the first lookup table. Step motor 60 is then energized through lead 27, FIG. 2, to align rotor 50 in the position as determined by the magnetic field produced by the energized windings and the digital signal representation of rotor position as produced by the code wheel attached to rotor 50 is sensed. The binary number of the switch operating position in which the rotor is positioned is sensed in the address corresponding to the digital signal representation produced by the code wheel in the second lookup table which, for purposes of this specification, will be assumed to be again switch operating position number two. Since rotor 50 is positioned in switch operating position number two, the desired switch operating position ten is subtracted from the actual switch operating position number two to produce a difference of minus eight. As this is a negative number with an absolute value less than twenty-four, rotor 50 is stepped in a clockwise direction a number of steps equal to the absolute value of this difference or eight steps to switch operating position number ten in which end 3b of actuator arm 3 is in register with operating tab 17a of switch 17. The digital signal representation as produced by code wheel 40 is again sensed and the binary number contained in the address of the second lookup table corresponding to this digital signal representation is sensed. If there is agreement between this sensed binary number and the binary number of the desired switch operating position, solenoid 75 is energized through lead 28, FIG. 2, to tilt arm 3 in a clockwise direction about the pivot point to effect the operation of operating tab 17a of load switch 17 substantially in the direction of central axis A away from rotor 50 to effect the "Off" switch function for load switch 17 to deenergize the parking lights. Upon the operation of solenoid 75, a logic 0 signal indicating the parking lights are "Off" is placed in the address or bit position of the actual switch operating condition memory device 25 corresponding to load switch 17.

From this description of the system of this invention, it is apparent that an electrical signal indication of the actual operating condition of each load switch is stored in a first memory device; that upon the occurrence of a function select signal, the electrical signal indication of the actual operating condition of the selected load switch is sensed and a different electrical signal indication of the other operating condition of the selected load switch is placed in a second memory device and that the microprocessor is responsive to this discrepancy of electrical signal indications for determining the switch operating position in which the actuator mechanism must be located to actuate the operating member of the selected load switch to effect the operation thereof to the other operating condition, for determining the actual switch operating position in which the actuator mechanism is located, for locating the actuator mechanism in the determined switch operating position if different than the actual switch operating position, for effecting the operation of the actuator mechanism when so located and for placing in the first memory device the electrical signal indication of the operating condition of the selected load switch subsequent to operation thereof.

To illustrate the operation of the system of this invention in greater detail, an actual microprocessor program flow chart for the control of step motor 60 as set forth in FIGS. 3 and 4 will now be explained.

At the initiation of this program, step motor 60 is powered down, the function select switches are continuously read and the actual and desired load switch operating condition memories 25 and 26 are continuously sensed. So long as the actual load switch operating condition memory 25 and the desired load switch operating condition memory 26 are the same or equal, the program continues around this minor loop including the "power down step motor", "read function select switches", and "actual=desired" blocks.

Upon the detection of a change of potential level upon any function select switch output lead, the logic signal contained in the address or addresses of the actual load switch operating condition memory 25 corresponding to the selected load switch or switches is sensed and the opposite logic signal indicative of the other switch operating condition is placed in the address or addresses of the desired load switch operating condition memory 26 corresponding to the selected load switch or switches.

As the actual and desired load switch operating condition memories 25 and 26 are no longer the same or equal, the desired switch operating position is looked up in a lookup table and stored. Upon the conclusion of this operation, the number of attempts to position rotor 50 in the desired switch operating position is loaded into an attempts register. In the actual embodiment, the number of attempts to place rotor 50 in the desired switch operating position is four. After this number of attempts has been loaded into the attempts register, step motor 60 is powered up and a wait period is inserted to permit the step motor to stabilize. At the conclusion of the wait period, the actual switch operating position as produced by code wheel 40 is read and converted to binary. After this actual switch operating position has been converted to binary, the number of steps and direction of step motor rotation required to place rotor 50 in the desired switch operating position is calculated in a manner hereinabove explained in detail. At the conclusion of this calculation step, a decision is made as to whether or not rotor 50 is in the correct switch operating position. In this regard, if the calculated number of steps is zero, the rotor is in the correct operating position, consequently, step motor 60 is not energized. At this time, it will be assumed that rotor 50 is not in the correct switch operating position. When this determination has been made, the number of attempts previously loaded in the attempts register is decremented by one, and the decision is made as to whether or not this is the last of four tries. As this is the first of four tries, it is determined whether or not there are more than nine steps required to place rotor 50 in the desired switch operating position.

At this time, it will be assumed that nine steps or less are required to position rotor 50 in the desired switch operating position. Therefore, a discrete step address pointer, a register, is loaded with the address of the first number of the word corresponding to the number of steps required to place rotor 50 in the desired switch operating position in accordance with the table set forth in FIG. 5. In this table, each of the numbers is a delay count number that is the number of counts of a clocking device such as a software delay loop and, as a consequence, each represents a wait delay period. For example, with a 0.1 millisecond clock, the number 100 would be 100 counts to produce a wait delay period of ten milliseconds. The addressed delay count is read and step motor 60 is stepped one step. As this is the initial step, there is a subsequent wait delay period as determined by the addressed delay count number. The delay address pointer is then loaded with the address of the next number of the word corresponding to the number of steps required to place rotor 50 in the desired switch operating position. This addressed delay count is read and step motor 60 is stepped one more step and so forth. The program remains in this minor loop until the last step as determined by the last number of the word corresponding to the number of desired steps is completed. For example, should the number of required steps be six, the discrete step address pointer is loaded with the address of the first number 100 of the word corresponding to six steps, the number 100 is read, step motor 60 is advanced one step, there is a wait delay period of 100 counts, the discrete step address pointer is loaded with the address of the second number 080 of the word corresponding to six steps, the number 080 is read, step motor 60 is advanced one step, there is a wait delay period of eighty counts, the discrete step address pointer is loaded with the address of the third number 073 of the word corresponding to six steps, the number 073 is read, step motor 60 is advanced one step, there is a wait delay of seventy-three counts, the discrete step pointer is loaded with the address of the fourth number 065 of the word corresponding to six steps, the number 065 is read, step motor 60 is advanced one step, there is a wait delay of sixty-five counts, the discrete step pointer is loaded with the address of the fifth number 105 of the word corresponding to six steps, the number 105 is read, step motor 60 is advanced one step, there is a wait delay period of one hundred five counts, and, as this is the end of this word, step motor 60 is advanced one step at the conclusion of this wait delay period. As this is the sixth and last step, a wait delay period of ten counts is interjected before the rotor position is checked. As the last step has been performed, after the wait delay period of ten counts has concluded, the actual switch operating position as produced by code wheel 40 is read and converted to binary. At the conclusion of this step, the number of steps and direction of step motor rotation is again calculated.

With this calculation, a determination is made as to whether or not rotor 50 is in the desired switch operating position. In the event it is not, the number of attempts placed in the attempts register is decremented by one and the steps hereinabove set forth are repeated. Should the calculation of the number of steps and direction of step motor rotation be zero, step motor 60 is in the correct switch operating position and a determination is made, FIG. 3, as to whether or not the cranking motor load switch of the switching unit is on. This portion of the flow chart of FIG. 3 will be explained in detail later in this specification.

Figure 4:
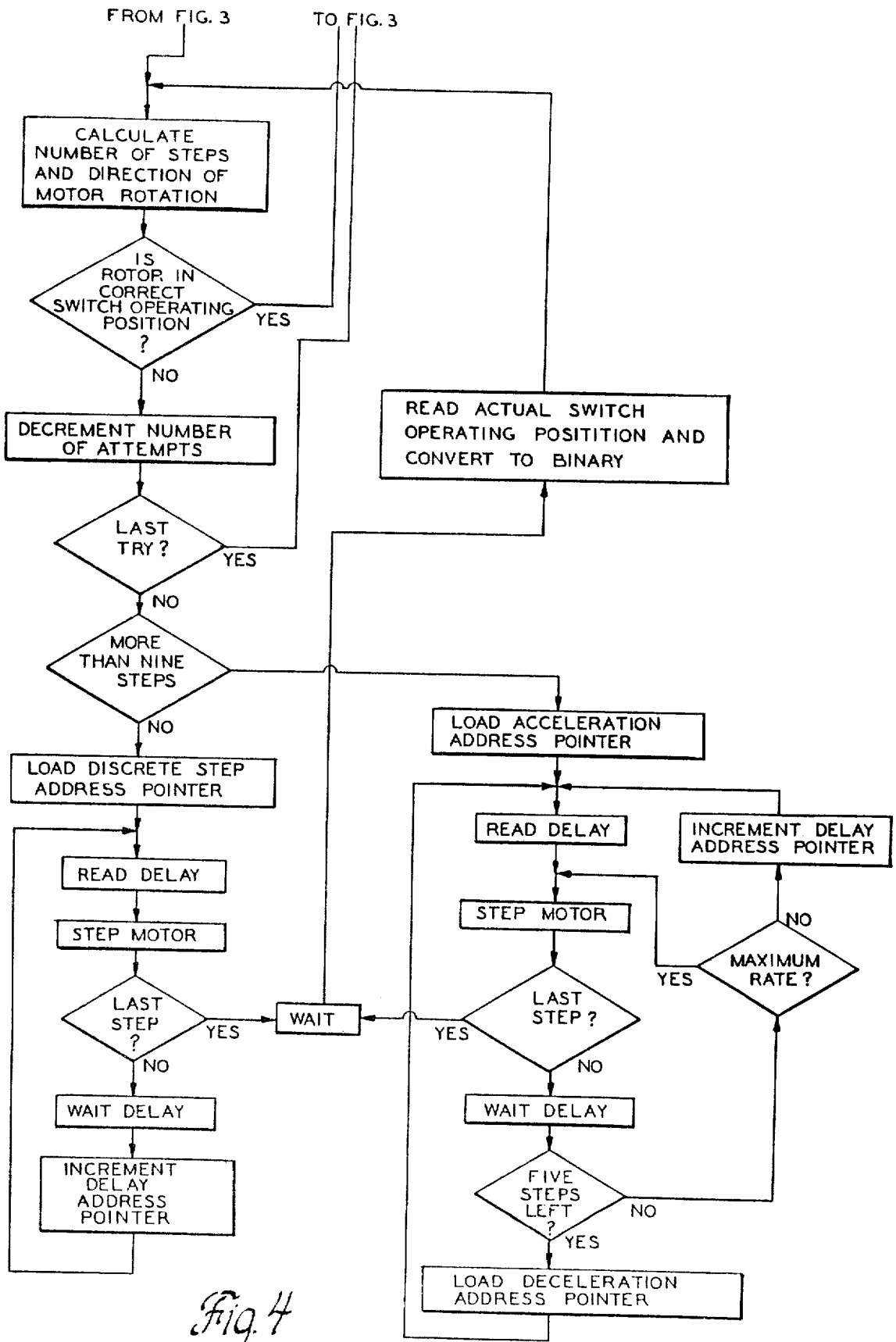
FIG. 4 is the remainder of the flow diagram of FIG. 3.

Assuming that the calculated number of steps for step motor 60 to place rotor 50 in the desired switch operating position is more than nine steps, FIG. 4, an acceleration address pointer is loaded with the address of the first number of the acceleration word that may be, for example, 100, 080, 070, 060, 050. This first number 100 is read and step motor 60 is advanced one step. As this is the initial step, there is a wait delay period of one hundred counts and, as this is still the initial step, there are a number of steps different than five steps left. Therefore, a determination is made as to whether or not step motor 60 is being stepped at its maximum rate. As it is not being stepped at its maximum rate at this time, the load acceleration address pointer is loaded with the address of the second number 080 of the acceleration word. This loop is continued in a manner as previously described with regard to the control of step motor 60 with nine steps or less. Assuming that the motor has been stepped through five steps and has been accelerated to a maximum speed as determined by the delay of 050 counts, the last number of the acceleration word, step motor 60 is being stepped at its maximum rate. Consequently, step motor 60 continues being stepped at this rate until there are five steps left. When there are five steps left, the deceleration address pointer register is loaded with the address of the first number of the deceleration word that may be, for example, 050, 070, 095, 010. This first number 050 is read and step motor 60 is advanced one step. As there are four more steps left, there is a wait delay period of fifty counts. As there are less than five steps left, the deceleration address pointer register is loaded with the address of the second number 070 of the deceleration word. This loop is continued in a manner as previously described until the last step. Upon the occurrence of the last step, there is a wait delay period of ten counts and the actual switch operating position as produced by code wheel 40 is read and converted to binary. At the conclusion of this step, thhan zero, rotor 50 is not in the correct switch operating position and, as a consequence, the number of attempts contained in the attempts register is decremented by one count. If the calculation of the number of steps is nine or less, the previously described loop with regard to nine steps or less is repeated or if the calculated number of steps is more then nine, the acceleration-deceleration loops are repeated.

From this description, in the loop of nine steps or less, step motor 60 is accelerated to a maximum speed and decelerated to a minimum speed within the number of steps required to place rotor 50 in the desired switch operating position and with the acceleration and deceleration loops, step motor 60 is accelerated in accordance with the acceleration word to a maximum speed which, in the actual embodiment is a delay of 50 counts between steps, is maintained at this maximum rate until there are five steps left and is decelerated in accordance with the deceleration word.

Figure 3:
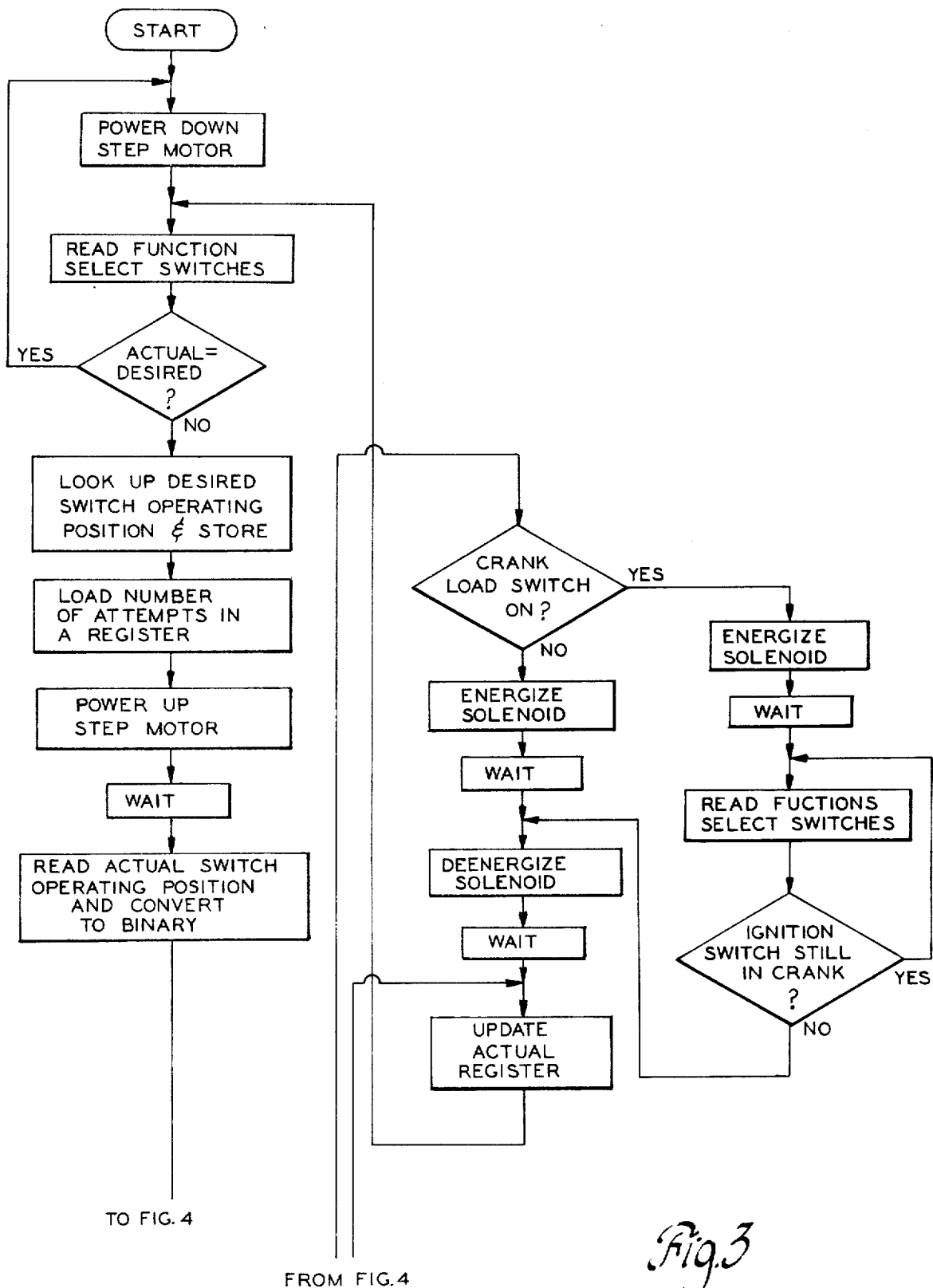
FIG. 3 is a portion of a flow diagram useful in understanding the operation of the system of this invention.

When the calculated number of steps to place rotor 50 in the correct switch operating position equals zero, the program continues on FIG. 3 with the next step in which a determination is made as to whether the switching unit cranking motor load switch is on or off.

Assuming for the present that the switching unit cranking motor load switch is on, solenoid coil 75 of the switching unit is energized. At the conclusion of a wait period, the function select switches are read. After the function select switches are read a determination is made as to whether or not the ignition switch is still in the crank position. If the ignition switch is still in the crank position, the function select switches are again read. So long as the ignition switch remains in the crank position, this minor loop is repeated. When the ignition switch is operated out of the crank position, solenoid coil 75 is deenergized. After a wait delay period, the actual switch operating condition register 26 is updated. At the conclusion of this update, the function select switches are again read and, so long as the actual load switch operating condition memory 25 is equal to the desired load switch operating condition memory 26, the previously described minor loop continues until a change of potential level upon any of the function select switch output leads changes from one level to another indicating that a switching function has been selected.

Should the switching unit cranking motor load switch not be on, solenoid coil 75 is energized. At the conclusion of a wait delay period of approximately 30 milliseconds in the actual embodiment, solenoid coil 75 is deenergized. At the conclusion of a wait delay period, the actual switch operating condition memory 26 is updated as before. At the conclusion of this updating step, the function select switches are again continuously scanned.

In the event rotor 50 is not positioned in the desired switch operating position at the conclusion of the number of attempts stored in the attempts register, it is assumed that there is something wrong that prevents the rotor from being so positioned. As a consequence, if the last try occurs without rotor 50 being placed in the desired switch operating position, the actual switch operating condition register 26 is updated anyhow and the program continues.

Although the system of this invention is described on the basis of sliding contact type load switches, it is to be specifically understood that other type load switches may be employed without departing from the spirit of the invention. For example, snap-action switches, latching type switches or push-button type load switches may be employed. Further, similarly actuated valvesfor the control of fluid circuits may also be employed and may be intermixed with electrical switches if so desired. Therefore, the system of this invention may be employed to selectively operate any circuit controlling device or devices such as switches for electrical circuits and/or valves for fluid circuits.

The system of this invention, therefore, may be employed for selectively controlling the circuit control devices included in motor vehicle circuits whether they be electrical or fluid. Therefore, for purposes of this specification, the terms "circuit" and "circuits" are to be interpreted broad enough to include both electrical circuits and fluid circuits.

While a preferred embodiment of the present invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. A system for selectively controlling the several electrical loads of a motor vehicle comprising:

a switching unit including a plurality of electrical load switches of the type operable to at least two operating conditions by the actuation of an operating member to positions that correspond respectively to said operating conditions, each of said load switches being connected in a corresponding vehicle load circuit;

selectively locatable actuator means shiftable between a plurality of locations, said actuator means when shifted to and stopped in one of said locations being operable by movement thereof to actuate an operating member into said positions such that a load switch is operated from one operating condition to another operating condition and vice versa dependent upon the initial operating condition of a load switch and the location of the actuator means;

function select means for producing output function select electrical signals, each of which indicates the selection of at least one of said load switches for operation;

and means responsive to said function select electrical signals for locating said actuator means in such a location that it may actuate the said operating member of said selected load switch and for effecting the operation of said actuator means when so located.

2. A system for selectively controlling the several electrical loads of a motor vehicle comprising:

a switching unit including a plurality of electrical load switches of the type operable to at least two operating conditions by the actuation of an operating member to positions that correspond respectively to said operating conditions, each of said load switches being connected in a corresponding vehicle load circuit;

actuator means that is operable to actuate said operating members and that is selectively locatable in each of a plurality of switch locations in each of which it is in register with a said operating member, said actuator means when shifted to and stopped in one of said switch locations being movable to actuate an operating member into said positions such that a load switch is operated from one operating condition to another operating condition and vice versa dependent upon the initial operating condition of a load switch and the location of the actuator means;

function select means for producing an output function select electrical signal that indicates a said load switch is selected for operation; and means responsive to said function select electrical signal for determining the said switch operating position in which said actuator means must be located to actuate the said operating member of the selected said load switch to effect the operation thereof to the other said operating condition, for determining the actual said switch operating position in which said actuator means is located, for locating said actuator means in said determined switch operating position if different than said actual switch operating position and for effecting the operation of said actuator means when so located.

3. A system for selectively controlling the several electrical loads of a motor vehicle comprising:

a switching unit including a plurality of electrical load switches of the type operable to at least two operating conditions by the actuation of an operating member to positions that correspond respectively to said operating conditions, each of said load switches being connected in a corresponding vehicle load circuit;

a common actuator that is operable to actuate said operating members and that is selectively locatable in each of a plurality of switch locations in each of which it is in register with a said operating member, said common actuator when shifted to and stopped in one of said switch locations being movable to actuate an operating member into said positions such that a load switch is operated from one operating condition to another operating condition and vice versa dependent upon the initial operating condition of a load switch and the location of the common actuator;

function select means for producing an output function select electrical signal that indicates a said load switch is selected for operation; and means responsive to said function select electrical signal for determining the said switch operating position in which said common actuator must be located to actuate the said operating member of the selected said load switch to effect the operation thereof to the other said operating condition, for locating said common actuator in said determined switch operating position and for effecting the operation of said common actuator when so located.

4. A system for selectively controlling the several electrical loads of a motor vehicle comprising:

a switching unit including a plurality of electrical load switches of the type operable to at least two operating conditions by the actuation of an operating member, each of said load switches being connected in a corresponding vehicle load circuit;

actuator means that is operable to actuate said operating members and that is selectively locatable in each of a plurality of switch locations in each of which it is in register with a said operating member;

first memory means for storing an electrical signal indicative of the acutal said operating condition of each said load switch;

function select means for producing an output function select electrical signal that indicates a said load switch is selected for operation;

second memory means;

means upon the occurrence of a said function select signal for sensing the electrical signal indicative of the acutal said operating condition of the selected said load switch and for placing in said second memory means a different electrical signal indicative of the other said operating condition of said selected load switch;

and means responsive to this discrepancy of electrical signal indications for determining the said switch location in which said actuator means must be located to actuate the said operating member of the selected said load switch to effect the operation thereof to the other said operating condition, for locating said actuator means in said determined switch location, for effecting the operation of said actuator means when so located and for placing in said first memory means the electrical signal indicative of the operating condition of the selected said load switch subsequent to operation thereof.

5. A system for selectively controlling the several electrical loads of a motor vehicle comprising:

a switching unit including a plurality of electrical load switches of the type operable to at least two operating conditions by the actuation of an operating member, each of said load switches being connected in a corresponding vehicle load circuit;

a common actuator that is operable to actuate said operating members and that is selectively locatable in each of a plurality of switch locations in each of which it is in register with a said operating member;

first memory means for storing an electrical signal indicative of the acutal said operating condition of each said load switch;

function select means for producing an output function select electrical signal that indicates a said load switch is selected for operation;

second memory means;

means upon the occurrence of a said function select signal for sensing the electrical signal indicative of the actual said operating condition of the selected said load switch and for placing in said second memory means a different electrical signal indicative of the other said operating condition of said selected load switch; and means responsive to this discrepancy of electrical signal indications for determining the said switch location in which said common actuator must be located to actuate the said operating member of the selected said load switch to effect the operation thereof to the other said operating condition, for determining the actual said switch location in which said common actuator is located, for locating said common actuator in said determined switch location if different than said actual switch location, for effecting the operation of said common actuator when so located and for placing in said first memory means the electrical signal indicative of the operating condition of the selected said load switch subsequent to operation thereof.

6. A system for selectively controlling the several circuits of a motor vehicle comprising:

a switching unit including a plurality of switchable circuit control devices of the type operable to at least two operating conditions by the actuation of an operating member to positions that correspond respectively to said operating conditions, each switchable control device being of a type that maintains itself in an operating condition when shifted to that operating condition, each of said circuit control devices being included in a corresponding vehicle circuit;

selectively locatable actuator means shiftable between a plurality of locations, said actuator means when shifted to and stopped in one of said locations being operable by movement thereof to actuate said operating members into said positions such that a control device is operated from one operating condition to another operating condition and vice versa dependent upon the initial operating condition of a control device and the location of the actuator means;

function select means for producing output function select electrical signals, each of which indicates the selection of at least one of said control devices for operation; and means responsive to said function select electrical signals for locating said actuator means in such a location that it may actuate the said operating member of said selected control device and for effecting the operation of said actuator means when so located.

* * * * *

UNITED STATES PATENT AND TRADEMARK OFFICE
CERTIFICATE OF CORRECTION

PATENT NO. : 4,481,585

DATED : November 6, 1984

INVENTOR(S) : Gerald O. Huntzinger; Raymond O. Butler, Jr.;
Lewis R. Hetzler; John Delaplane; Anthony L. Marks It is certified that error appears in the above-identified patent and that said Letters Patent is hereby corrected as shown below:

Column 6, line 21, after "individual" insert -- electrical switch operating tabs. To tiltably mount actuator arm 3 about an axis of tilt substantially normal to central axis A and inboard of the circle defined by the individual electrical switch operating tabs, a stanchion 54, Figure 10, carried by rotor --;

line 21, delete "electricaor".

Column 17, line 52, after "step," insert -- the number of steps and direction of rotor rotation is calculated and a determination is made as to whether or not rotor 50 is in the desired switch operating position. As has been brought out before, if this calculation produces a number other than --.

Column 18, line 53, delete "valvesfor" and substitute -- valves for --.

Column 20, claim 4, line 59, delete "acutal" and substitute
-- actual --.

Column 21, claim 5, line 21, delete "acutal" and substitute
-- actual --.

Signed and Sealed this

Twenty-second Day of October 1985

[SEAL]

Attest:

DONALD J. QUIGG

Attesting Officer

Commissioner of Patents and
Trademarks—Designate